United States Patent Office 3,098,836
Patented July 23, 1963

3,098,836
ORGANOPOLYSILOXANE RUBBER STABILIZED WITH NICKEL, COPPER OR TUNGSTEN SALTS OR OXIDES
William J. Bobear, Latham, N.Y., assignor to General Electric Company, a corporation of New York
No Drawing. Filed Apr. 11, 1960, Ser. No. 21,141
4 Claims. (Cl. 260—37)

The present invention relates to improved organopolysiloxane rubber compositions and to a method for making them. More particularly, the present invention relates to a method of producing organopolysiloxane rubber compositions having improved heat-age resistance by incorporating certain metallic compounds into organopolysiloxanes, and to the resulting rubber compositions produced thereby.

Organopolysiloxane rubber compositions are generally recognized as being more temperature resistant and less subject to decomposition than the more conventional types of synthetic-organic or natural rubbers. A serious problem that has troubled industry is that organopolysiloxane rubber compositions often become brittle and lose many of their desirable qualities after extensive use at elevated temperatures. Heat-aging of organopolysiloxane rubber compositions can be reduced by incorporating into the polymer effective amounts of red iron oxide during the manufacturing stages. As a result, the useful life of organopolysiloxane rubber compositions has been substantially increased.

While red iron oxide has improved the heat-age resistance of organopolysiloxane rubber compositions, it has a vivid red color and must be incorporated into the organopolysiloxane rubber composition in relatively high amounts to be an effective heat-age additive. As a result it is virtually impossible to successfully tint organopolysiloxane rubber compositions containing iron oxide to a variety of attractive shades to improve the appearance of the cured product because the red color of the iron oxide is too dominant.

It has now been discovered that by incorporating into organopolysiloxanes an effective amount of metallic compounds comprising certain nickel and copper salts, and tungsten oxide, and nickel oxide markedly improved readily tintable rubber compositions are produced that exhibit superior resistance to heat-aging. In addition to enhancing the heat-age resistance of organopolysiloxane rubber compositions, the compounds included within the scope of the present invention as heat-age additives are substantially neutral in color.

An effective amount of a heat-age additive is an amount sufficient to impart to a cured organopolysiloxane rubber sample an improved resistance to heat-aging as compared to samples containing no heat-age additive. Heat-age causes an alteration in the desirable physical properties of an organopolysiloxane polymer at temperatures above 150° over an extended period of time.

In accordance with the present invention, there are provided organopolysiloxane rubber compositions having improved resistance to heat-aging comprising (1) 100 parts of an organopolysiloxane convertible to the cured, solid, elastic state, (2) 10 to 200 parts of a filler (3) and an effective amount of a metallic compound selected from the class of nickel acetate, nickel chloride, nickel octoate, copper acetate, copper octoate, nickel oxide, and tungsten oxide, said organopolysiloxane having a viscosity of at least one hundred thousand centipoises when measured at 25° C., the organo radicals of said organopolysiloxane being members selected from the class of monovalent hydrocarbon radicals, halogenated monovalent hydrocarbon radicals, and cyanoalkyl radicals, said organo radicals being attached to silicon by carbon-silicon linkages, there being an average of about 1.98 to 2.01 organo radicals per silicon atom.

The preferred metallic compounds that are included within the scope of the present invention are nickel acetate, nickel chloride, and tungsten trioxide ($WO_3$). The metallic salts that are within the scope of the present invention are in their higher valence state and are effective in concentrations ranging from about 0.01 to about 3 parts of metal, preferably 0.1 to 2 parts per 100 parts of organopolysiloxane polymer. Tungsten oxide and nickel oxide (NiO) have been found to be effective in the range of about .8 to 20 parts by weight calculated as the metal per 100 parts of organopolysiloxane polymer, and a preferred range is about .8 to about 8 parts calculated as the metal per 100 parts of polymer.

The fillers that are employed in the organopolysiloxane rubber compositions, are known to the art as reinforcing, and semi-reinforcing fillers. The reinforcing fillers, such as the silica fillers, including fumed silica, precipitated silica and the like, are structure inducing and depending on their manufacture, may contain or be free of hydroxyl groups either in the form of adsorbed moisture or bonded to silicon atoms. These structure inducing silicone rubber fillers may be modified such as, for example, by the introduction of silicon-bonded alkoxy groups in place of some hydroxyl groups, resulting in some advantages as decreased structure when incorporated with a convertible organopolysiloxane composition.

The preferred silica filler of the present invention is a fumed silica filler made by fuming processes including the vapor phase burning of silicon tetrachloride or ethyl silicate, an example being what is known to the trade as Cab–O–Sil. Since a fumed silica contains a relatively low degree of moisture, it is particularly valuable as a filler additive in organopolysiloxane rubber which is to be used in electrical applications. Examples of other silica reinforcing fillers may be found described in U.S. Patents 2,541,137, 2,610,167 and 2,657,149. Such fillers may be slightly acidic or alkaline (that is, have pH's below or above 7) depending upon the method of manufacture, such as by an aerogel process. Examples of semi-reinforcing or usually non-structure forming type, are titanium oxide, lithopone, calcium carbonate, iron oxide, and diatomaceous earth.

Although the convertible organopolysiloxanes employed in the practice of the present invention are well known in the art, attention is directed to the convertible organopolysiloxanes disclosed in Agens Patent 2,448,756 and Sprung et al. Patent 2,448,556, the latter two patents being issued September 7, 1948, Sprung Patent 2,484,595, issued October 11, 1949; Krieble et al. Patent 2,457,688, issued December 28, 1948; Marsden Patent 2,521,528, issued September 5, 1950—all the foregoing patents being assigned to the same assignee as the present invention; Hyde Patent 2,490,357, issued December 5, 1949; and Warrick Patent 2,541,137, issued February 13, 1951. It will, of course, be understood by those skilled in the art that the convertible organopolysiloxanes referred to herein contain the same or different silicon-bonded organic substituents (e.g., methyl, ethyl, propyl, vinyl, allyl, phenyl, tolyl, xylyl, benzyl, phenylethyl, naphthyl, chlorophenyl, cyanoethyl, both methyl and phenyl, etc. radicals) connected to the silicon atoms by carbon-silicon linkages.

The particular convertible organopolysiloxanes used are not critical and may be any one of those described in the foregoing patents. They may be viscous masses or gummy solids depending upon the state of condensation of the starting organopolysiloxanes, polymerizing agent, etc., and may be prepared by condensation of a liquid organopolysiloxane containing an average of about 1.95, preferably from about 1.98 to about 2.01 organic groups per silicon atom. The polymerizing agents that can be employed are well known in the art and can include, for instance, ferric chloride hexahydrate, phenyl phosphoryl chloride; alkaline condensing agents such as potassium hydroxide, sodium hydroxide, etc. Each convertible organopolysiloxane generally comprises a polymeric diorganosiloxane which can contain, if desired, for example, up to 2 mole percent copolymerized monoorganosiloxane, for example, copolymerized monomethylsiloxane and a small molar (e.g., less than 1 mole) percent of triorganosiloxy units, e.g., trimethylsiloxy units. Generally, it is preferred to use as the starting liquid organopolysiloxanes (or mixtures of organopolysiloxanes) from which the convertible organopolysiloxanes are prepared, ones which contain about 1.999 to 2.01, inclusive, organic groups, for example, methyl groups per silicon atom, and where preferably more than 50 percent, e.g., more than 75 percent, of the silicon atoms in the polysiloxane contain two silicon-bonded lower alkyl, e.g., methyl groups.

The starting organopolysiloxanes used to make the convertible organopolysiloxanes advantageously comprise organic constituents consisting essentially of monovalent organic radicals attached to silicon by carbon-silicon linkages, and in which essentially all the siloxane units consist of units of the structural formula $R_2SiO$, where R is preferably a radical of the group consisting of methyl and phenyl radicals. At least 50 to 75 percent of the total number of R groups are preferably methyl radicals. The polysiloxane can be one in which all the siloxane units are $(CH_3)_2SiO$, or the siloxane can be a copolymer of dimethylsiloxane with a minor amount (e.g., from 1 to 20 or more mole percent) of any of the following units, separately or mixtures thereof: $(C_6H_5)(CH_3)SiO$ and $(C_6H_5)_2SiO$. The presence of halogen, e.g., chlorine, atoms on the phenyl nucleus is also within the purview of the present invention.

Where alkenyl groups are attached to silicon by carbon-silicon linkages, it is preferable that the alkenyl groups (for instance, vinyl groups, allyl groups, etc.) be present in an amount equal to from 0.05 to 2 mole percent of the total number of silicon bonded organic groups in the convertible organopolysiloxane.

Various curing agents to effect more rapid conversion of the convertible organopolysiloxane to the cured, solid, elastic state can be incorporated. Among such curing agents can be mentioned, for instance, benzoyl peroxide, tertiary butyl perbenzoate, bis-(2,4-dichlorobenzoyl) peroxide, etc. These curing agents (or "vulcanization accelerators" as they are often designated) can be present in amounts ranging from about 0.1 to as high as 4 to 8 percent or more, by weight, based on the weight of the convertible organopolysiloxane. High energy electron irradiation without curing agents can also be employed for vulcanizing purposes.

The metallic compounds can be incorporated into the convertible organopolysiloxane formulation in any desired manner. If the metallic compound is incorporated into the organopolysiloxane in the form of a salt such as a metallic octoate, chloride or acetate, it is preferred to add the metallic compound to the organopolysiloxane in the form of a solution. The metallic octoate for example, can be added in the form of a hydrocarbon solvent solution while the acetate and chloride can be added to the organopolysiloxane in the form of a water solution. Suitable hydrocarbon solvents that can be employed with the metallic octoate include mineral spirits, toluene, benzene, xylene, etc. If the metallic compound is added in the form of tungsten oxide, or nickel oxide, it is desirable to add it as a solid in a particle size range of 50 microns or below to avoid possibly modifying the properties desired in the final cured rubber product.

The incorporation of the metallic compound into the organopolysiloxane can be performed at any stage of the processing. The metallic compound can be added directly into the organopolysiloxane polymer, into the polymer and filler mixture or, if desired, can be added along with the filler into the polymer. It is advisable to add the metallic compound to the organopolysiloxane prior to the addition of the curing catalyst to avoid undesirable side effects and to achieve optimum results.

If the metallic compound is added in the form of tungsten oxide or nickel oxide, it can be conveniently added along with the filler while milling the organopolysiloxane. When adding the metallic compound in the form of a salt solution, employing either a hydrocarbon solvent or water, it is also expedient to add the salt solution along with the filler to facilitate the dispersion of the metallic compound throughout the polymer. It is advisable to eliminate excess amounts of solvent from the system prior to the curing of the organopolysiloxane-filler mixture. This can be accomplished conveniently by employing external heat and a high degree of circulation around the vicinity of the uncured compound.

Addition of a suitable curing agent can be performed at any stage of the processing but it is preferred to add it after mixing the organopolysiloxane gum with the filler and the metallic compound. Thereafter, the composition can be molded or used in any application desired. When molding the curable organopolysiloxane formulation, pressures from about 100 to 2,000 p.s.i. or more may be employed in combination with temperatures ranging from about 80° C. to 200° C. or higher. Under such conditions, the time required for effecting the desired cure will depend upon such factors as the type of curing agent, concentration thereof, the type of organopolysiloxane, the type and amount of filler, the use desired etc. Persons skilled in the art will have little difficulty in determining the optimum conditions under various situations involving different temperatures, proportions and ingredients.

A suitable convertible organopolysiloxane composition was prepared as follows to be used later in the examples to illustrate the practice of the invention.

Ninety-eight parts by weight of octamethylcyclopolysiloxane, 0.2 part of 1,3,5,7-tetramethyl-1,3,5,7-tetravinylcyclotetrasiloxane and 0.001 part of potassium hydroxide were heated at a temperature of about 155° C. with agitation for about 4 hours to obtain a highly viscous, benzene soluble mass of only slight flow. This material had an average of approximately 1.98 methyl groups and 0.002 vinyl group per silicon atom and a viscosity of about 6 million centistokes.

The tungsten oxide and nickel oxide employed in the examples were in the form of fine powders having a particle size of less than 50 microns. The nickel and copper octoate were used in the form of a six percent solution of the metal, as the octoate, in mineral spirits. Nickel acetate, nickel chloride, and copper acetate were obtained in crystalline form and were used in the form of about a ten to thirty-five percent water solution. Throughout the examples, the metallic compounds are expressed in parts by weight of metal to provide uniformity.

In order that those skilled in the art may better understand how the present invention can be practiced, the following examples are given by way of illustration and not by way of limitation. All parts are by weight.

EXAMPLE 1

A mixture of 100 parts of the convertible organopolysiloxane described above and 4 parts of diphenylsilanediol were milled on a 2 roll mill while 0.05 part of nickel in the form of a 10 percent water solution of nickel acetate was added to the polymer. During the addition of the nickel salt, 45 parts of fumed silica were also gradually added to the resulting organopolysiloxane formulation. When the organopolysiloxane formulation had been thoroughly mixed, 0.9 part of a 50% benzoyl peroxide paste in a dimethylpolysiloxane fluid was added. Test strips in the form of ASTM slabs were molded from the resulting mixture for 10 minutes at about 132° C. and post-cured for 24 hours at about 250° C. The test strips were then heat-aged for an additional 24 hours at 315° C. Following the same procedure additional test strips were made from organopolysiloxane compositions containing 0.10 part, 0.50 part, 1.0 part, and 2.0 parts of nickel in the form of a nickel acetate.

EXAMPLE 2

The procedure of Example 1 was repeated except that the nickel was added to the organopolysiloxane formulation in the form of a mineral spirits solution of nickel octoate containing 6 percent nickel. The organopolysiloxane polymer was heated to eliminate the mineral spirits. After cooling the resulting formulation, the curing catalyst was added and the procedure of Example 1 was continued. Additional test strips containing 0.15 and 0.30 part nickel in the form of nickel octoate was made.

EXAMPLE 3

In accordance with the procedure of Example 1 test strips were prepared that contained nickel metal in the form of nickel chloride. The different test samples that were prepared contained 0.5 part, 1.0 part and 2.0 parts of nickel.

EXAMPLE 4

The procedure of Example 1 was repeated except that the metallic compound was added to the organopolysiloxane formulation in the form of a ten percent water solution of copper acetate. A series of test samples were prepared from the resulting organopolysiloxane formulation that contained a range of 0.05 part of copper to 1.0 part of copper in the form of copper acetate.

EXAMPLE 5

Test strips in accordance with the procedure of Example 2 were prepared which contained 0.02 part and 0.10 part of copper added as a six percent solution of copper as the octoate in mineral spirits.

EXAMPLE 6

One hundred parts of the convertible organopolysiloxane and 8 parts of diphenylsilanediol were placed in a doughmixer and a mixture of 40 parts of fumed silica and 4 parts of tungsten metal in the form of tungsten oxide were gradually added. After the formulation was mixed for 1 hour at 110 to 115° C., 2 parts of benzoyl peroxide was added. When the composition had aged for 24 hours, slabs were cut from a sheet formed by milling the composition. The slabs were press cured and post-cured for 1 hour at 150° C., and 24 hours at 250° C. Test samples were then prepared in accordance with the procedure of Example 1. Additional test strips were made that contained eight parts of tungsten and 20 parts of tungsten. The test strips were then heat-aged for an additional 24 hours at 315° C.

EXAMPLE 7

The procedure of Example 6 was repeated except that 4 parts of nickel in the form of nickel oxide were employed in preparing suitable test strips that were heat-aged for 24 hours at 315° C.

Control strips were also made in accordance with the above procedure, that contained 5 parts of red iron oxide per 100 parts of organopolysiloxane polymer. In addition, control strips were made that were free of a heat-age additive.

After the test strips of examples and controls were press cured and conditioned for 24 hours at 250° C., measurements were made with the strips according to ASTM specification as shown in Table I below. Hardness (H), (Shore A) tensile strength, p.s.i. (T), and elongation percent (E) were determined. After initial measurements were taken, the test strips were subjected to an additional heat treatment by placing them in an oven 24 hours at about 315° C. Measurements were again taken to determine whether the properties of the strips were altered due to the possible effects of heat-aging.

The parts by weight of metallic compound in Table I below are expressed in terms of parts by weight of metal per 100 parts of the convertible organopolysiloxane.

*Table I*

| Additive | Parts | Cured 24 Hrs./250° C. | | | Heat-aged 24 Hrs./315° C. | | |
|---|---|---|---|---|---|---|---|
| | | H | T | E | H | T | E |
| None (Control) | | 56 | 938 | 310 | (¹) | (¹) | (¹) |
| Iron Oxide | 5 | 56 | 828 | 310 | 71 | 570 | 190 |
| Nickel Acetate | 0.10 | 55 | 1,100 | 360 | 64 | 589 | 180 |
| Do | 0.50 | 55 | 932 | 320 | 60 | 723 | 260 |
| Do | 1.0 | 52 | 917 | 330 | 57 | 712 | 270 |
| Do | 2.0 | 57 | 1,026 | 300 | 63 | 846 | 230 |
| Nickel Octoate | 0.15 | 43 | 863 | 500 | 58 | 581 | 250 |
| Do | 0.30 | 37 | 619 | 650 | 56 | 610 | 320 |
| Nickel Chloride | 0.5 | 57 | 1,095 | 340 | 65 | 531 | 170 |
| Do | 1.0 | 56 | 1,004 | 380 | 62 | 560 | 230 |
| Do | 2.0 | 56 | 905 | 310 | 62 | 639 | 220 |
| Copper Acetate | 0.05 | 51 | 797 | 320 | 65 | 480 | 130 |
| Do | 0.10 | 47 | 749 | 380 | 64 | 451 | 140 |
| Do | 0.50 | 46 | 446 | 360 | 61 | 349 | 139 |
| Do | 1.0 | 59 | 367 | 140 | 71 | 348 | 70 |
| Copper Octoate | .02 | 38 | 412 | 520 | 64 | 438 | 120 |
| Do | 0.10 | 41 | 196 | 310 | 62 | 514 | 180 |
| Tungsten Oxide | 4.0 | 55 | 1,013 | 300 | 60 | 630 | 270 |
| Do | 20.0 | 57 | 670 | 250 | 72 | 490 | 100 |

¹ Too brittle to test.

The data of Table I clearly illustrates the effectiveness of the substantially color-free metal compounds of the present invention in imparting improved heat-age resistance to organopolysiloxane rubber compositions. The test strips that were prepared in accordance with Example 7, employing nickel oxide were also found to have substantially improved resistance to heat-aging as compared to the sample containing no heat-age additive. In addition the metal compounds of the present invention, are at least equally as effective as iron oxide as a heat-age additive at considerably lower or comparable weight levels.

While the foregoing examples have of necessity been limited to only a few of the very many variables within the scope of the present invention, it should be understood that the present invention covers a much broader class of organopolysiloxane compositions containing the metal compounds included within the scope of the present invention. All of these various materials are prepared by methods specifically illustrated in the example above and described further in the foregoing description of the present invention.

As a result of the present invention silicone rubber is now available to the art which has resistance to heat-aging and which can be readily tinted to a variety of shades by conventional pigments.

What I claim as new and desire to secure by Letters Patent of the United States is:

1. Organopolysiloxane compositions by weight, consisting essentially of (1) 100 parts of an organopolysiloxane, (2) 10 to 200 parts of a filler (3) and 0.01 to 3 parts of a metallic element in the form of a metal salt selected from the class consisting of nickel acetate, nickel chloride, and nickel octoate, said organopolysiloxane having a viscosity of at least 100,000 centipoises when measured at 25° C., and consisting essentially of chemically combined diorganosiloxane units, monoorganosiloxane units, and triorganosiloxane units, the organo radicals of said organopolysiloxane being members selected from the class consisting of monovalent hydrocarbon radicals, halogenated monovalent hydrocarbon radicals and cyanoalkyl radicals, there being an average of about 1.98 to 2.01 organo radicals per silicon atom.

2. A composition in accordance with claim 1 in which the metal salt is nickel acetate.

3. A composition in accordance with claim 1 in which the metal salt is nickel chloride.

4. A process for producing an organopolysiloxane rubber composition having improved resistance to heat-aging comprising mixing together by weight, (1) 0.01 to 3 parts of a metallic element in the form of a metal salt selected from the class consisting of nickel acetate, nickel chloride, and nickel octoate, (2) 100 parts of an organopolysiloxane, (3) 10 to 200 parts of a filler, (4) and a peroxide curing catalyst, and curing the resulting composition at temperatures in the range of 80° C. to 200° C., said organopolysiloxane having a viscosity of at least 100,000 centipoises when measured at 25° C., and consisting essentially of chemically combined diorganosiloxane units, monoorganosiloxane units, and triorganosiloxane units, the organo radicals of said organopolysiloxane being members selected from the class consisting of monovalent hydrocarbon radicals, halogenated monovalent hydrocarbon radicals, and cyanoalkyl radicals, there being an average of about 1.98 to 2.01 organo radicals per silicon atom.

References Cited in the file of this patent

UNITED STATES PATENTS

| | | |
|---|---|---|
| 2,803,613 | Kather et al. | Aug. 20, 1957 |
| 2,875,098 | Blatz | Feb. 24, 1959 |
| 2,927,907 | Polmanteer | Mar. 8, 1960 |
| 2,983,694 | Page et al. | May 9, 1961 |

FOREIGN PATENTS

| | | |
|---|---|---|
| 559,241 | Canada | June 24, 1958 |